(12) United States Patent
Gao et al.

(10) Patent No.: US 11,229,014 B2
(45) Date of Patent: Jan. 18, 2022

(54) METHODS AND APPARATUSES FOR TRANSMITTING CONTROL INFORMATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 18 days.

(21) Appl. No.: 16/620,612

(22) PCT Filed: Jun. 15, 2017

(86) PCT No.: PCT/CN2017/088513
§ 371 (c)(1),
(2) Date: Dec. 9, 2019

(87) PCT Pub. No.: WO2018/227499
PCT Pub. Date: Dec. 20, 2018

(65) Prior Publication Data
US 2020/0205142 A1    Jun. 25, 2020

(51) Int. Cl.
*H04W 72/04* (2009.01)
*H04L 5/00* (2006.01)

(52) U.S. Cl.
CPC ....... *H04W 72/0406* (2013.01); *H04L 5/0048* (2013.01)

(58) Field of Classification Search
CPC ... H04L 5/0091; H04L 5/0014; H04L 5/0048; H04L 5/0053; H04L 5/00; H04L 1/00; H04L 25/02; H04L 1/0038; H04L 1/0009; H04L 5/0007; H04L 5/0094; H04L 1/0013; H04L 5/0044; H04B 7/26;
(Continued)

(56) References Cited

U.S. PATENT DOCUMENTS 10,320,473 B2 *  6/2019  Kim ................... H04L 5/0012
10,615,910 B2 *  4/2020  Seo ................... H04L 1/0009
(Continued)

FOREIGN PATENT DOCUMENTS

WO    2016/072570 A1    5/2016
WO    2017/025113 A1    2/2017

OTHER PUBLICATIONS

"Downlink Control Channel Framework", InterDigital Communications, RI-1700704, 3GPP TSG RAN WG1 AH NR Meeting, Jan. 16-20, 2017, pp. 1-4, Spokane, USA.
(Continued)

*Primary Examiner* — Man U Phan
(74) *Attorney, Agent, or Firm* — Sughrue Mion, PLLC

(57) ABSTRACT

Embodiments of the present disclosure relate to methods and devices for transmitting control information. In example embodiments, a method implemented in a network device is provided. According to the method, a first configuration for transmitting first control information from the first network device to a terminal device is determined based on a first control resource set (CORESET). The first configuration being different from a second configuration for transmitting second control information from a second network device to the terminal device and the second configuration being determined based on a second CORESET. The first control information is transmitted to the terminal device based on the first configuration.

17 Claims, 13 Drawing Sheets

(58) Field of Classification Search
CPC . H04W 72/0406; H04W 72/12; H04W 72/04; H04W 72/042; H04W 72/0413; H04W 72/0446; H04W 72/0453; H04W 72/1289; H04W 72/1273
USPC .......................................................... 370/329
See application file for complete search history.

(56) References Cited

U.S. PATENT DOCUMENTS

| | | | |
|---|---|---|---|
| 10,917,216 B2* | 2/2021 | Su | H04L 1/0038 |
| 2017/0006586 A1* | 1/2017 | Gulati | H04W 72/042 |
| 2018/0132255 A1* | 5/2018 | Hessler | H04W 72/0406 |
| 2020/0015208 A1* | 1/2020 | Noh | H04L 1/1822 |
| 2020/0187236 A1* | 6/2020 | Moon | H04L 5/0053 |
| 2020/0220703 A1* | 7/2020 | Kim | H04L 5/10 |
| 2020/0367242 A1* | 11/2020 | Moon | H04L 1/00 |

OTHER PUBLICATIONS

"DL Common Control for NR",, ZTE Corporation, ZTE Microelectronics, 3GPP TSG RAN WG1 NR Ad-Hoc Meeting, R1-1700258, Jan. 16-20, 2017, 4 pages, Spokane, USA.
"NR DL control channel structure", CATT, 3GPP TSG RAN WG1 Meeting #88, R1-1702092, Feb. 13-17, 2017, 4 pages, Athens, Greece.
International Search Report for PCT/CN2017/088513 dated Feb. 24, 2018 (PCT/ISA/210).

* cited by examiner

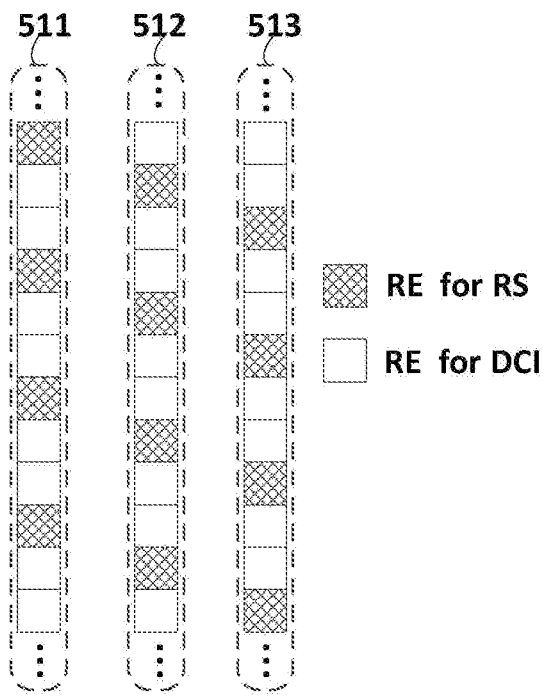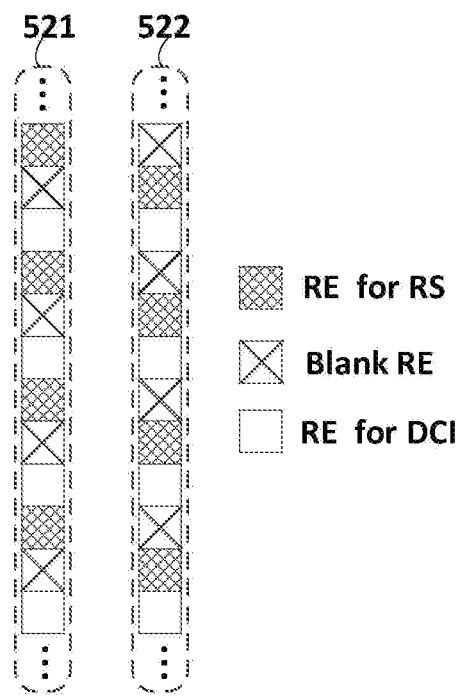
Fig. 5A
Fig. 5B
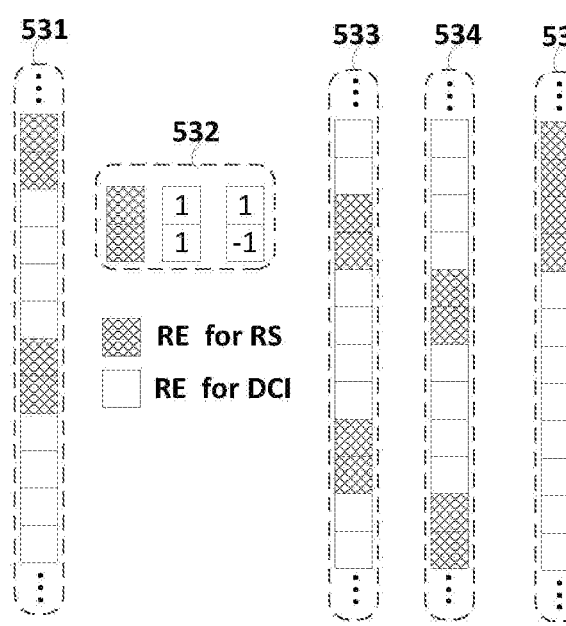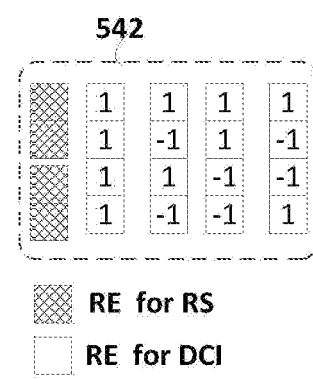
Fig. 5C
Fig. 5D

US 11,229,014 B2

METHODS AND APPARATUSES FOR TRANSMITTING CONTROL INFORMATION

CROSS REFERENCE TO RELATED APPLICATIONS

This application is a National Stage of International Application No. PCT/CN2017/088513 filed Jun. 15, 2017, the disclosure of which is incorporated herein in its entirety by reference.

TECHNICAL FIELD

Embodiments of the present disclosure generally relate to the field of telecommunication, and in particular, to methods and apparatuses for transmitting control information.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as multi-Transmission and Reception Point (multi-TRP) transmission and/or multi-panel transmission, are studied for new radio access.

Conventionally, a network device (for example, an eNB, a gNB or a TRP) may transmit Downlink Control Information (DCI) via Physical Downlink Control Channel (PDCCH) to a terminal device (for example, a user equipment (UE)) in the system. For example, the DCI may indicate resource allocation for uplink and/or downlink data transmission. Concurrently, a demodulation reference signal (DMRS) associated with PDCCH may also be transmitted from the network device to the terminal device. The DMRS may be used by the terminal device for channel demodulation. Then, the terminal device may attempt to blindly decode the DCI in a predefined set of resource element groups (REGs). In response to decoding the DCI successfully, the terminal device may perform the uplink and/or downlink data transmission accordingly.

However, multiple PDCCHs each scheduling a respective Physical Downlink Shared Channel (PDSCH) transmitted from a separate TRP has been designed and agreed in 3GPP specification works. The terminal device can be configured to monitor multiple PDCCHs on multiple beam pair links simultaneously. In some cases, this may bring interferences on DMRS associated with the PDCCH, resulting in relatively poor channel estimation performance.

SUMMARY

In general, example embodiments of the present disclosure provide methods and apparatuses for transmitting control information.

In a first aspect, there is provided a method implemented in a network device. According to the method, a first configuration for transmitting first control information from the first network device to a terminal device is determined based on a first control resource set (CORESET). The first configuration being different from a second configuration for transmitting second control information from a second network device to the terminal device and the second configuration being determined based on a second CORESET. The first control information is transmitted to the terminal device based on the first configuration.

In a second aspect, there is provided a method implemented in a terminal device. According to the method, a blind detection for control information in first and second CORESETs is performed. First control information is transmitted from a first network device to the terminal device based on a first configuration. Second control information is transmitted from a second network device to the terminal device based on a second configuration. The first and second configurations are determined based on the first and second CORESETs respectively, and the first configuration is different from the second configuration. In response to detecting the first control information from the first network device, the terminal device communicates with the first network device based on the first control information. In response to detecting the second control information from the second network device, the terminal device communicates with the second network device based on the second control information.

In a third aspect, there is provided a network device. The network device comprises a processor and a memory coupled to the processor. The memory stores instructions that when executed by the processor, cause the network device to perform actions. The actions comprise: determining, based on a first CORESET, a first configuration for transmitting first control information from the first network device to a terminal device, the first configuration being different from a second configuration for transmitting second control information from a second network device to the terminal device and the second configuration being determined based on a second CORESET; and transmitting, based on the first configuration, the first control information to the terminal device.

In a fourth aspect, there is provided a terminal device. The terminal device comprises a processor and a memory coupled to the processor. The memory stores instructions that when executed by the processor, cause the terminal device to perform actions. The actions comprise: performing a blind detection for control information in first and second CORESETs, first control information being transmitted from a first network device to the terminal device based on a first configuration, second control information being transmitted from a second network device to the terminal device based on a second configuration, the first and second configurations being determined based on the first and second CORESETs respectively, and the first configuration being different from the second configuration; in response to detecting the first control information from the first network device, communicating with the first network device based on the first control information; and in response to detecting the second control information from the second network device, communicating with the second network device based on the second control information.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIGS. 5A-5D show examples of some embodiments of the present disclosure;

Throughout the drawings, the same or similar reference numerals represent the same or similar element.

DETAILED DESCRIPTION

Figure 1:
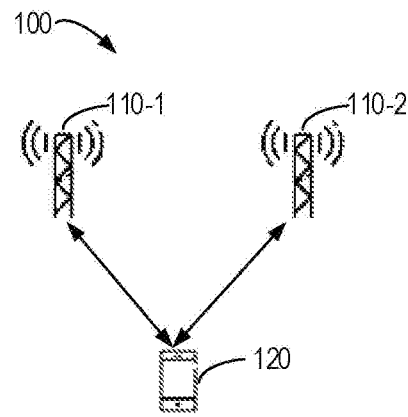
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, a TRP, and the like. For the purpose of discussion, in the following, some embodiments will be described with reference to TRP as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes two network device 110-1 and 110-2 (collectively referred to as network devices 110 or individually referred to as network device 110) and one terminal device 120 served by the network devices 110. It is to be understood that the number of base stations and terminal devices is only for the purpose of illustration without suggesting any limitations. The network 100 may include any suitable number of base stations and the terminal devices adapted for implementing embodiments of the present disclosure.

The network devices 110 may communicate with the terminal device 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, each of the network devices 110 may transmit control information to the terminal device 120 in a downlink. Taking the network device 110-1 as an example, the network device 110-1 may transmit DCI via a PDCCH to the terminal device 120. The DCI may indicate resource allocation for data transmission in a downlink or uplink. As used herein, a "downlink" refers to a link from a network device to a terminal device, while an "uplink" refers to a link from the terminal device to the network device. Concurrently, a demodulation reference signal (DMRS) associated with the PDCCH may also be transmitted from the network device 110-1 to the terminal device 120. The DMRS may be used by the terminal device 120 for channel demodulation. Then, the terminal device 120 may attempt to blindly decode the DCI in a control information set (CORESET). As used herein, a "CORESET" refers to a set of REGs within which the terminal device attempts to blindly decode the DCI. In response to decoding the DCI successfully, the terminal device 120 may perform the uplink and/or downlink data transmission (for example, data transmission via PDSCH and/or Physical Uplink Shared Channel (PUSCH)) with the network device 110-1 accordingly.

Similarly, the network device 110-2 may also transmit DCI via another PDCCH to the terminal device 120 concurrently with the network device 110-1. Another DMRS may also be transmitted from the network device 110-2 to the terminal device 120, which may be used by the terminal device 120 for channel demodulation. The terminal device 120 may attempt to blindly decode the DCI from the network device 110-2 in another CORESET. The CORESETs from the network devices 110-1 and 110-2 may be same as or different from each other. In some cases, using the CORESETs from both the network devices 110-1 and 110-2 may bring interferences on DMRS. For example, the terminal device 120 may be unable to differentiate different PDCCHs from different network devices, which may result in relatively poor channel estimation performance.

In order to solve the problems above and one or more of other potential problems, a solution for transmitting control information is provided in accordance with example embodiments of the present disclosure. With the solution, the terminal device can differentiate different PDCCHs from different network devices, and thus relatively good channel estimation performance can be achieved.

Figure 2:
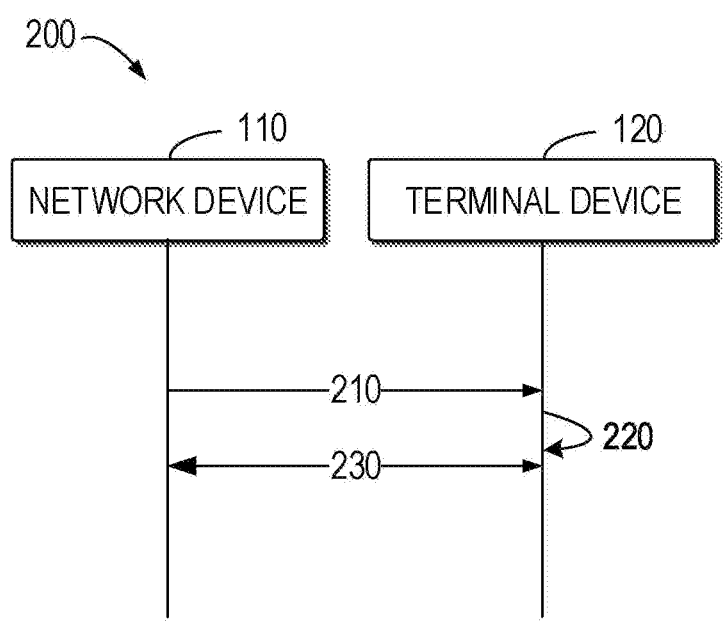
FIG. 2 shows a process for transmitting control information according to some embodiments of the present disclosure.

Principle and implementations of the present disclosure will be described in detail below with reference to FIGS. 2-15, in which FIG. 2 shows a general process 200 for transmitting control information according to some embodiments of the present disclosure. For the purpose of discussion, the process 200 will be described with reference to FIG. 1. The process 200 may involve the terminal device 120 and one or more network devices 110 serving the terminal device 120.

In one embodiment, the network device 110 may transmit (210) DCI to a terminal device 120 in a predetermined CORESET. In one embodiment, the CORESET for the network device 110 may be predetermined based on some factors related to the network device 110, for example, cell load and/or beam management capability (such as, whether hybrid beamforming is supported or not). In one embodiment, information on the predetermined CORESET for the network device 110 may be indicated to the terminal device 120 in advance. In one embodiment, the DCI transmitted via PDCCH may indicate resource allocation for uplink and/or downlink data transmission (for example, data transmission via PDSCH and/or PUSCH). Concurrently, in one embodiment, a DMRS associated with the PDCCH may also be transmitted from the network device 110 to the terminal device 120. The DMRS may be used by the terminal device 120 for PDCCH demodulation. In one embodiment, the terminal device 120 may then perform (220) a blind detection for DCI in the predetermined CORESET. In one embodiment, in response to successfully detecting the DCI from the network device 110, the terminal device 120 may perform (230) the uplink and/or downlink data transmission with the network device 110 accordingly.

Figure 3:
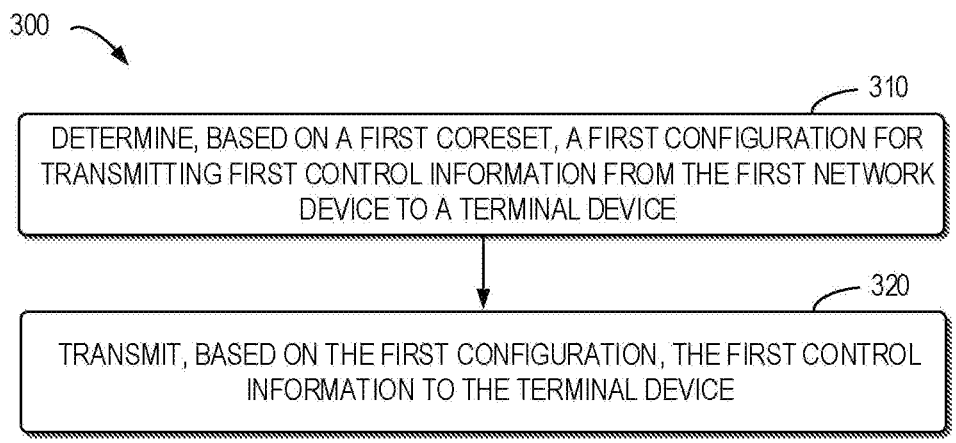
FIG. 3 shows a flowchart of an example method according to some embodiments of the present disclosure.

FIG. 3 shows a flowchart of an example method 300 for transmitting control information according to some embodiments of the present disclosure. The method 300 can be implemented at the network device 110-1 and/or 110-2 as shown in FIG. 1. For the purpose of discussion, the method 300 will be described from the perspective of the network device 110-1 with reference to FIG. 1. Only for the purpose of illustration without suggesting any limitation, in the following descriptions, the network device 110-1 may be also referred to as a "first network device", and the network device 110-2 may be also referred to as a "second network device".

In act 310, the network device 110-1 determines, based on a first CORESET, a first configuration for transmitting first control information from the first network device to the terminal device 120. In some embodiments, the first configuration may be different from a second configuration for transmitting second control information from a second network device (for example, the network device 110-2) to the terminal device 120. For example, the second configuration may be determined based on a second CORESET. Then, in act 320, the network device 110-1 may transmit, based on the determined first configuration, the first control information to the terminal device 120.

In one embodiment, the first CORESET for the network device 110-1 may be predetermined based on some factors related to the network device 110-1, for example, cell load and/or beam management capability (such as, whether hybrid beamforming is supported or not). In one embodiment, the first CORESET may include a first set of REGs, which may be continuous or discontinuous in time and/or frequency domain. Each of the first set of REGs may comprise a plurality of resource elements (REs), which may be continuous or discontinuous in time and/or frequency domain. In one embodiment, the second CORESET for the network device 110-2 may be predetermined based on some factors related to the network device 110-2, for example, cell load and/or beam management capability (such as, whether hybrid beamforming is supported or not). Likewise, in some embodiments, the second CORESET may include a second set of REGs, which may be continuous or discontinuous in time and/or frequency domain. Each of the second set of REGs may comprise a plurality of resource elements (REs), which may be continuous or discontinuous in time and/or frequency domain.

In some embodiments, information on the first and second CORESETs for different network devices 110 may be preset in the system. In some other embodiments, the information on the first and second CORESETs may be communicated between the network devices 110-1 and 110-2. Alternatively or in addition, the information on the first and second CORESETs may be indicated to the terminal device 120 in advance.

In some embodiments, the first configuration may indicate a first set of resource elements (REs) in the first CORESET are allocated for transmitting the first control information via a first control channel and a second set of REs in the first CORESET are allocated for transmitting a first reference signal (RS) associated with the first control channel. In some embodiments, the second configuration may indicate a third set of REs in the second CORESET are allocated for transmitting the second control information via a second control channel and a fourth set of REs in the second CORESET are allocated for transmitting a second RS associated with the second control channel. In some embodiments, as will be further described in detail in the following, in order to determine the first configuration, at least one of frequency-first mapping, time-first mapping, localized mapping or distributed mapping may be applied to REGs in the first CORESET.

In some embodiments, the first CORESET may be same as the second CORESET. That is, the network devices 110-1 and 110-2 may use a same CORESET for PDCCH transmission.

In one embodiment, in case that the network devices 110-1 and 110-2 use a same CORESET for PDCCH transmission, the first configuration may be determined such that the first set of REs are at least partially separated from the third set of REs in time or frequency domain. FIG. 4A-4D shows examples of such embodiments.

Figure 4A:
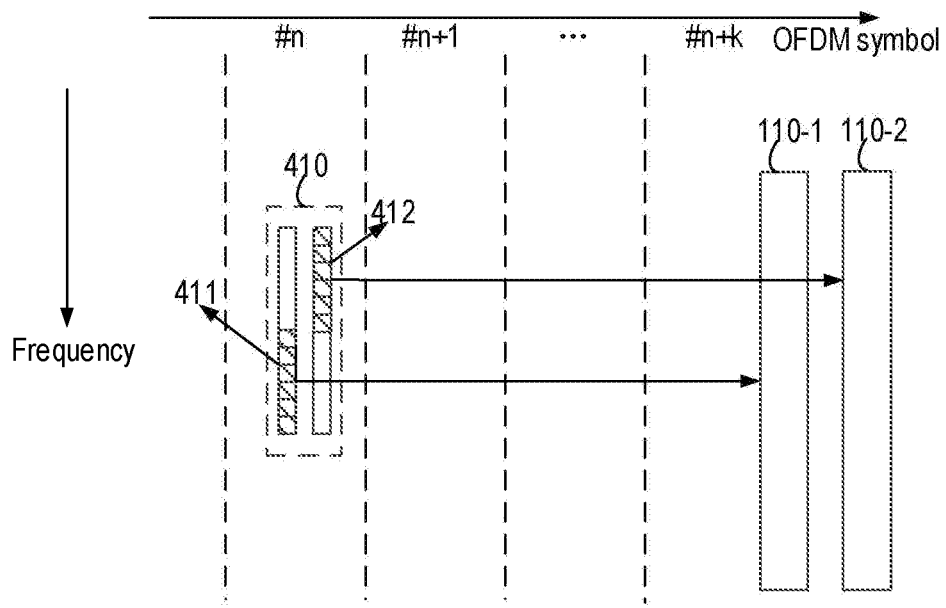
FIGS. 4A-4D show examples of some embodiments of the present disclosure.

As shown in FIG. 4A, the network devices 110-1 and 110-2 use CORESET 410 for PDCCH transmission. CORESET 410 may include a set of REGs, which may be continuous or discontinuous in time and/or frequency domain. In some embodiments, as shown in FIG. 4A, frequency-first and localized mapping is applied to REGs in CORESET 410, so as to separate a first set of REGs 411 allocated for the network device 110-1 from a second set of REGs 412 allocated for the network device 110-2 in time and/or frequency domain. For example, with the frequency-first and localized mapping, the first set of REGs 411 allocated for the network device 110-1 are located in one symbol (for example, OFDM symbol #n as shown in FIG. 4A) and concentrated in frequency domain, while the second set of REGs 412 allocated for the network device 110-2 are also located in the same symbol (that is, OFDM symbol #n as shown in FIG. 4A) and concentrated in frequency domain. Specially, in some embodiments, the first and second sets of REGs 411 and 412 may share a same pattern.

Figure 4B:
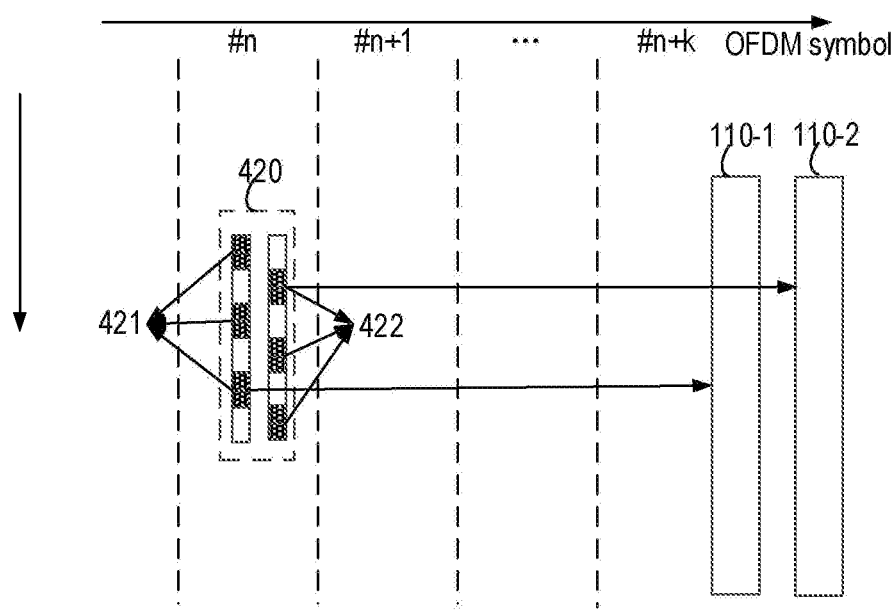

As shown in FIG. 4B, the network devices 110-1 and 110-2 use CORESET 420 for PDCCH transmission. CORESET 420 may include a set of REGs, which may be continuous or discontinuous in time and/or frequency domain. In some embodiments, as shown in FIG. 4B, frequency-first and distributed mapping is applied to REGs in CORESET 420, so as to separate a first set of REGs 421 allocated for the network device 110-1 from a second set of REGs 422 allocated for the network device 110-2 in time and/or frequency domain. For example, with the frequency-first and distributed mapping, the first set of REGs 421 allocated for the network device 110-1 are located in one symbol (for example, OFDM symbol #n as shown in FIG. 4B) and distributed in frequency domain, while the second set of REGs 422 allocated for the network device 110-2 are also located in the same symbol (that is, OFDM symbol #n as shown in FIG. 4B) and distributed in frequency domain. Specially, in some embodiments, the first and second sets of REGs 421 and 422 may share a same pattern.

Figure 4C:
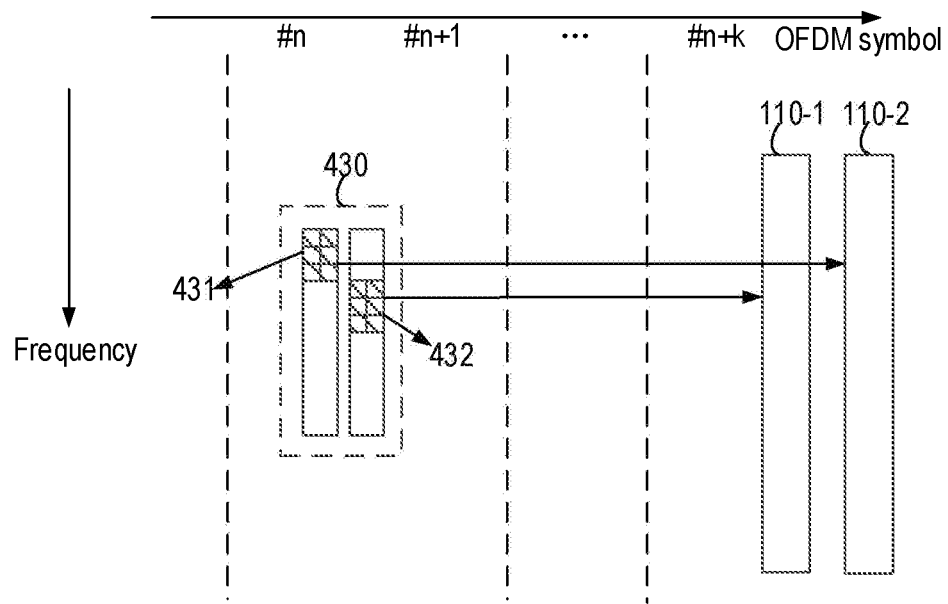

As shown in FIG. 4C, the network devices 110-1 and 110-2 use CORESET 430 for PDCCH transmission. CORESET 430 may include a set of REGs, which may be continuous or discontinuous in time and/or frequency domain. In some embodiments, as shown in FIG. 4C, time-first and localized mapping is applied to REGs in CORESET 430, so as to separate a first set of REGs 431 allocated for the network device 110-2 from a second set of REGs 432 allocated for the network device 110-1 in time and/or frequency domain. For example, with the time-first and localized mapping, the first set of REGs 431 allocated for the network device 110-2 are located in different symbols (for example, OFDM symbols #n and #n+1 as shown in FIG. 4C) and concentrated in frequency domain, while the second set of REGs 432 allocated for the network device 110-1 are also located in the different symbols (that is, OFDM symbols #n and #n+1 as shown in FIG. 4C) and concentrated in frequency domain. Specially, in some embodiments, the first and second sets of REGs 431 and 432 may share a same pattern.

Figure 4D:
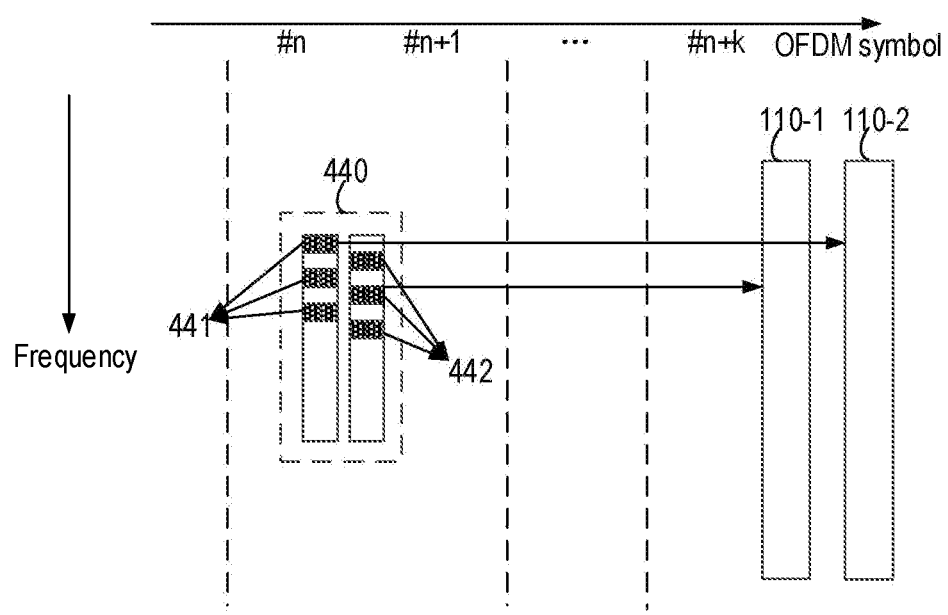

As shown in FIG. 4D, the network devices 110-1 and 110-2 use CORESET 440 for PDCCH transmission. CORESET 440 may include a set of REGs, which may be continuous or discontinuous in time and/or frequency domain. In some embodiments, as shown in FIG. 4D, time-first and distributed mapping is applied to REGs in CORESET 440, so as to separate a first set of REGs 441 allocated for the network device 110-2 from a second set of REGs 442 allocated for the network device 110-1 in time and/or frequency domain. For example, with the time-first and distributed mapping, the first set of REGs 441 allocated for the network device 110-2 are located in different symbols (for example, OFDM symbols #n and #n+1 as shown in FIG. 4D) and distributed in frequency domain, while the second set of REGs 442 allocated for the network device 110-1 are also located in the different symbols (that is, OFDM symbols #n and #n+1 as shown in FIG. 4D) and distributed in frequency domain. Specially, in some embodiments, the first and second sets of REGs 441 and 442 may share a same pattern.

In some embodiments, no matter the network devices 110-1 and 110-2 use a same CORESET or not, the first configuration may be determined such that the first RS from the network devices 110-1 differs from the second RS from the network device 110-2 based on at least one of the following: different resource allocation in time, frequency and/or code domain, different Orthogonal Cover Codes (OCCs), different RS sequences and different cyclic shifts (CSs). As such, Orthogonal and/or quasi-orthogonal RSs from different network devices may be provided to the terminal device, enabling the terminal device to differentiate different PDCCHs from different network devices. FIG. 5A-5B shows examples of such embodiments.

As shown in FIG. 5A, in one embodiment, a first set of REGs 511 allocated for the network device 110-1 may comprise a first set of REs for transmitting DCI and a second set of REs for transmitting DMRS. For example, in one embodiment, there may be 12 REs in one REG, among which there may be 8 REs for DCI and 4 REs for DMRS. In one embodiment, a second set of REGs 512 allocated for the network device 110-2 may comprise a third set of REs for transmitting DCI and a fourth set of REs for transmitting DMRS. In one embodiment, the second and fourth sets of REs are separated from each other based on Frequency Division Multiplexing (FDM) technology. In one embodiment, the location (such as, in time and/or frequency domain) of REs for transmitting DMRS may be determined based on one or more parameters related to the network device (such as, a TRP) and/or a corresponding cell. For example, the one or more parameters may include at least one of the following: an identity of the cell, an identity of the TRP, an identity of a beam, a value of frequency shift of the REs, a value of an offset of the REs, and so on.

As shown in FIG. 5B, in one embodiment, a first set of REGs 521 allocated for the network device 110-1 may comprise a first set of REs for transmitting DCI and a second set of REs for transmitting DMRS. In one embodiment, there may be 12 REs in one REG, among which there may be 4 REs for DCI, 4 REs for DMRS and 4 blank REs. The blank REs may be used for reducing the interference of DMRS from other cell/TRP. In one embodiment, a second set of REGs 522 allocated for the network device 110-2 may comprise a third set of REs for transmitting DCI and a fourth set of REs for transmitting DMRS. In one embodiment, the second and fourth sets of REs are separated from each other based on Frequency Division Multiplexing (FDM) technology. In one embodiment, different DMRS ports for different beams/TRPs/cells may be multiplexed based on different frequency shift. Examples are shown as 511, 512 and 513 in FIG. 5A, where 3 DMRS ports may be multiplexed. In one embodiment, one or more values of frequency shift may be configured for DMRS. For example, if only one value of frequency shift is configured for DMRS, for example, only one pattern selected from 511, 512 and 513 may be supported. That is, different DMRS ports may not be multiplexed. Alternatively, if two values of frequency shift are configured for DMRS, for example, two patterns selected from 511, 512 and 513 may be supported. That is, two DMRS ports may not be multiplexed.

As shown in FIG. 5C, in one embodiment, a first set of REGs allocated for the network device 110-1 may comprise a first set of REs for transmitting DCI and a second set of REs for transmitting DMRS. In one embodiment, a second set of REGs allocated for the network device 110-2 may comprise a third set of REs for transmitting DCI and a fourth set of REs for transmitting DMRS. In one embodiment, the second and fourth sets of REs are separated from each other based on different OCCs. For example, as shown in FIG. 5C, {1, 1} and {1, −1} are applied to the second and fourth sets of REs respectively. In one embodiment, there may be 4 REs for transmitting DMRS in one REG. Two DMRS ports may be multiplexed by applying length-2 FD-OCC (e.g. {1, 1} and {1, −1}) to the 4 REs. An example is shown as 532 in FIG. 5C. In one embodiment, there may be 4 REs for transmitting DMRS in one REG. Four DMRS ports may be multiplexed by applying length-4 FD-OCC (e.g. {1, 1, 1, 1}, {1, −1, 1, −1}, {1, 1, −1, −1} and {1, −1, −1, 1}) to the 4 REs. An example is shown as 542 in FIG. 5D. In one embodiment, different DMRS ports may be configured for PDCCHs from different beams and/or TRPs and/or Cells. In one embodiment, the 4 REs may be continuous, discontinuous, or partially continuous. For example, two of the 4 REs may be continuous in the REG. An example of the 4 continuous REs may be shown as 535 in FIG. 5C. An example of the 4 discontinuous REs may be shown as 511 in FIG. 5A. An example of the 4 partially continuous REs (such as, two of the 4 REs are continuous) in the REG may be shown as 531 in FIG. 5C. In one embodiment, different frequency shift of the REs may be configured for DMRS associated with PDCCHs from different beams and/or TRPs and/or cells. Examples may be shown as 531 and 533 in FIG. 5C. In one embodiment, more DMRS ports may be multiplexed based on FDM, different frequency shift and/or OCC. Examples are shown as 531, 532, 533 and 534 in FIG. 5C, where totally 6 DMRS ports are multiplexed. In one embodiment, length-2 OCC may be applied to two patterns selected from 531, 533 and 534, and thus totally 4 DMRS ports may be multiplexed. In one embodiment, as shown by 531, 533, 534 and 542, totally 12 DMRS ports may be multiplexed.

In some embodiments, due to limited orthogonal RS ports, different network devices may not be able to provide orthogonal or quasi-orthogonal RSs to the terminal device. In this case, in some embodiments, some preprocessing may be conducted before PDCCH transmission so as to reduce the interferences.

Figure 6A:
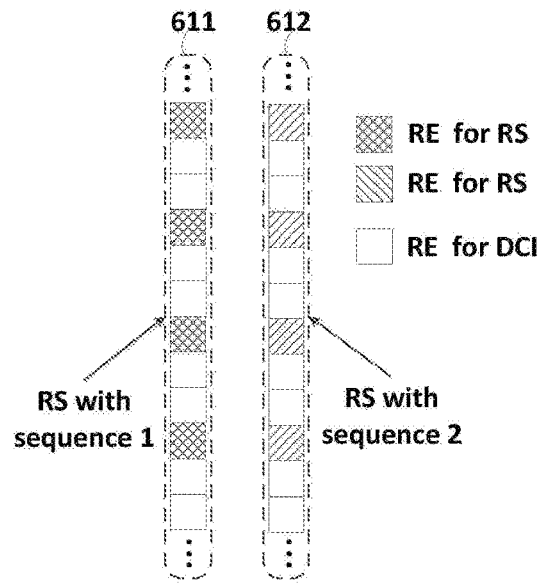
FIGS. 6A-6D show examples of some embodiments of the present disclosure.

In one embodiment, no matter the network devices 110-1 and 110-2 use a same CORESET or not, a first RS configuration may be determined for the first RS from the network devices 110-1. For example, the first RS configuration may be different from a second RS configuration for the second RS from the network devices 110-2. In some embodiments, the first and second RS configurations may be based on different RS patterns and/or different RS sequences. The information on the first and second RS configurations may be indicated by the network devices 110-1 and 110-2 to the terminal device 120, respectively. As such, the terminal device 120 may estimate different PDCCHs based on the information on the first and second RS configurations. FIG. 6A shows an example of such embodiment.

As shown in FIG. 6A, in one embodiment, a first set of REGs 611 allocated for the network device 110-1 may comprise a first set of REs for transmitting DCI and a second set of REs for transmitting the first RS. In one embodiment, a second set of REGs 612 allocated for the network device 110-2 may comprise a third set of REs for transmitting DCI and a fourth set of REs for transmitting the second RS. In one embodiment, the second and fourth sets of REs are overlapped with each other in frequency domain. However, in one embodiment, different RS sequences are applied to the first and second RSs, so as to enable the terminal device 120 to differentiate different PDCCHs from different network devices based on the different RS sequences.

Figure 6B:
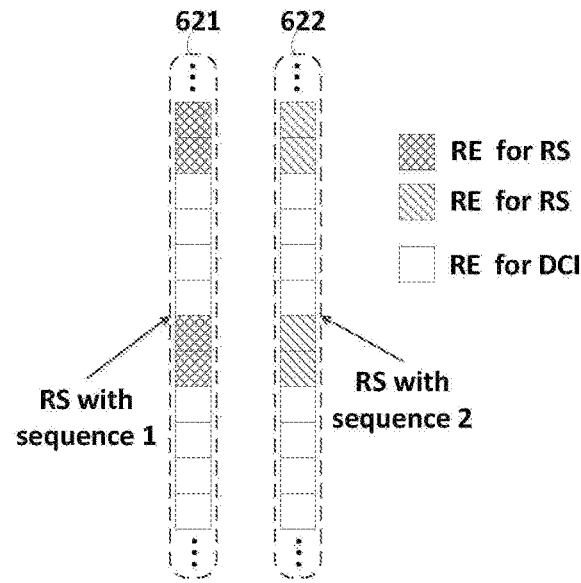

As shown in FIG. 6B, in one embodiment, a first set of REGs 621 allocated for the network device 110-1 may comprise a first set of REs for transmitting DCI and a second set of REs for transmitting the first RS. In one embodiment, a second set of REGs 622 allocated for the network device 110-2 may comprise a third set of REs for transmitting DCI and a fourth set of REs for transmitting the second RS. In one embodiment, the second and fourth sets of REs are overlapped with each other in frequency domain. However, in one embodiment, different RS sequences are applied to the first and second RSs, so as to enable the terminal device 120 to differentiate different PDCCHs from different network devices based on the different RS sequences.

Figure 6C:
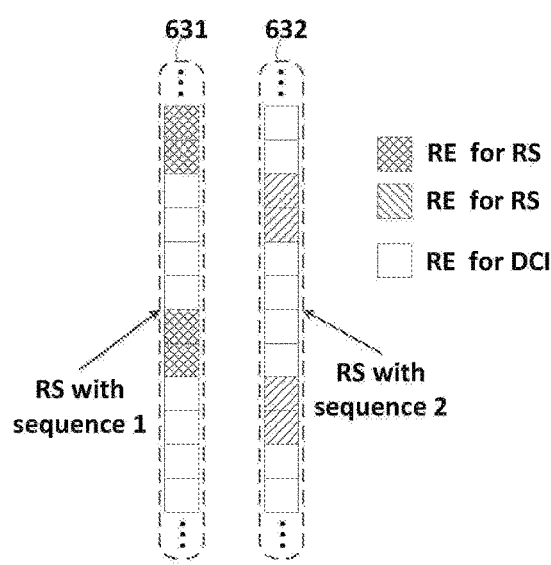

As shown in FIG. 6C, in one embodiment, a first set of REGs 631 allocated for the network device 110-1 may comprise a first set of REs for transmitting DCI and a second set of REs for transmitting the first RS. In one embodiment, a second set of REGs 632 allocated for the network device 110-2 may comprise a third set of REs for transmitting DCI and a fourth set of REs for transmitting the second RS. In one embodiment, the second and fourth sets of REs are overlapped with each other in frequency domain. However, in one embodiment, different RS sequences may be applied to the first and second RSs, and the REs for DMRS may be shifted in frequency, so as to enable the terminal device 120 to differentiate different PDCCHs from different network devices based on the different RS sequences.

Figure 6D:
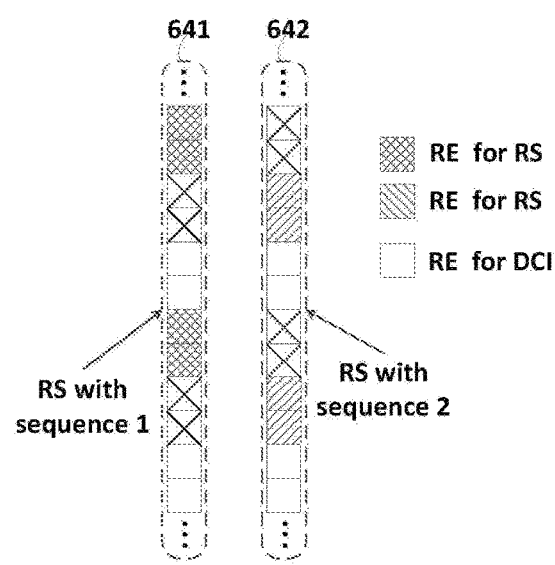

In some embodiments, the first set of REGs allocated for the network device 110-1 may comprise a first set of REs for transmitting DCI and a second set of REs for transmitting the first RS, while the second set of REGs allocated for the network device 110-2 may comprise a third set of REs for transmitting DCI and a fourth set of REs for transmitting the second RS. In one embodiment, if the second set of REs are separated from the fourth set of REs based on an offset, the first set of REs for transmitting DCI from the network device 110-1 may be at least partially overlapped with the fourth set of REs for transmitting the second RS from the network device 110-2, and the second set of REs for transmitting the first RS from the network device 110-1 may be at least partially overlapped with the third set of REs for transmitting DCI from the network device 110-2. In one embodiment, in this case, the overlapped REs for transmitting DCI may become unavailable (also called as "muted") so as to increase channel estimation frequency. In some embodiments, the muting of the overlapped REs for transmitting DCI may be conducted fully or partially. Because the transmission of DCI may have high redundancy, the adverse effect can be reduced. An example of such embodiment is shown in FIG. 6D.

In some embodiments, in case that the network devices 110-1 and 110-2 use a same CORESET for PDCCH transmission, the network devices 110-1 and 110-2 may use thinner beams for PDCCH transmission, so as to reduce the interferences. In this case, the solution for PDCCH transmission may be transparent to the terminal device 120.

Figure 7:
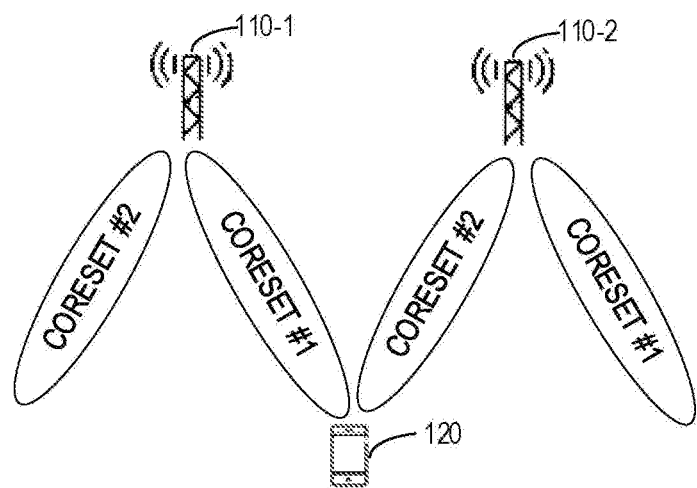
FIG. 7 shows an examples of some embodiments of the present disclosure.

In some embodiments, the first CORESET for the network device 110-1 may be predetermined based on some factors related to the network device 110-1, for example, cell load and/or beam management capability (such as, whether hybrid beamforming is supported or not); while the second CORESET for the network device 110-2 may be predetermined based on some factors related to the network device 110-2, for example, cell load and/or beam management capability (such as, whether hybrid beamforming is supported or not). In one embodiment, for example in case that the network devices 110 support hybrid beamforming, the first CORESET may be different from the second CORESET. FIG. 7 shows an example of such embodiment. As shown in FIG. 7, CORESET #1 is used by the network device 110-1 for transmitting control information, while CORESET #2 is used by the network device 110-2 for transmitting control information.

In some embodiment, the first CORESET for the network device 110-1 (such as, CORESET #1 as shown in FIG. 7) and the second CORESET for the network device 110-2 (such as, CORESET #2 as shown in FIG. 7) may be separated from each other in time and/or frequency domain.

Figure 8A:
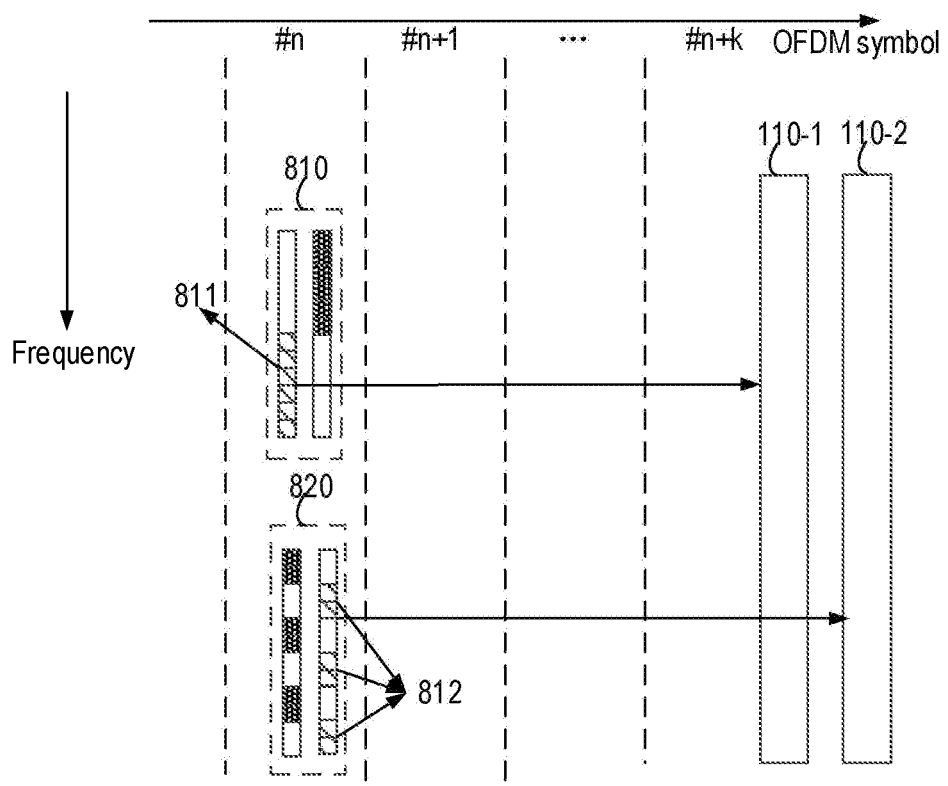
FIGS. 8A-8B show examples of some embodiments of the present disclosure.
Figure 8B:
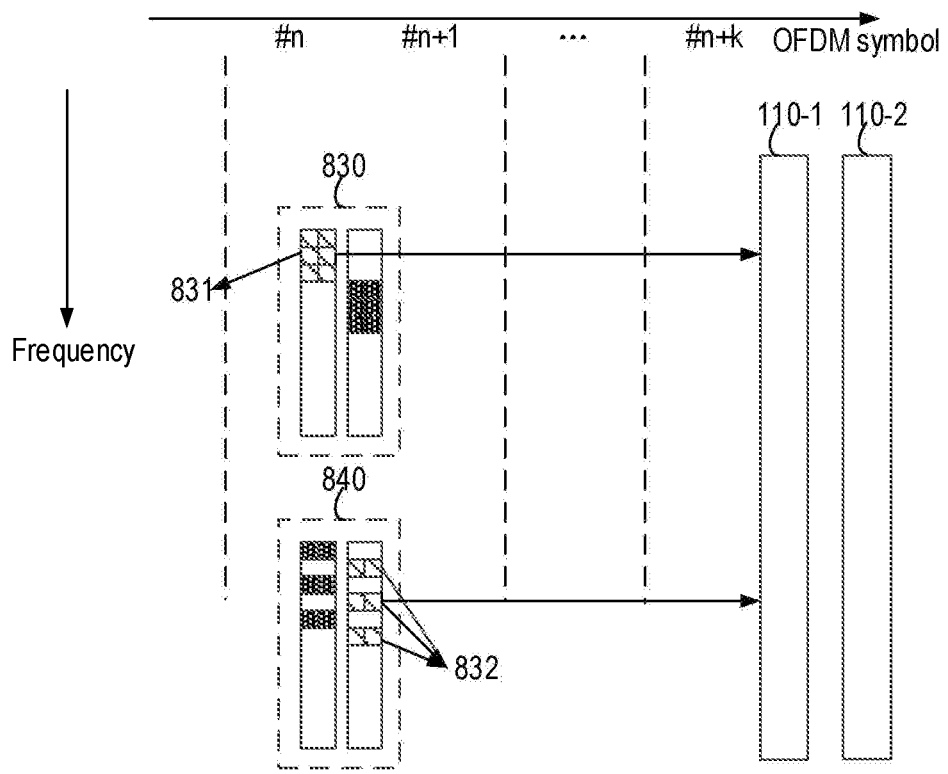

For example, in one embodiment, the first CORESET for the network device 110-1 and the second CORESET for the network device 110-2 may be multiplexed based on FDM technology. That is, the first and second CORESET are separated from each other in frequency domain. In this case, the interferences on DMRS can be reduced. FIGS. 8A-8B show examples of such embodiments.

As shown in FIG. 8A, the network device 110-1 uses CORESET 810 for PDCCH transmission, while the network device 110-2 uses CORESET 820 for PDCCH transmission. CORESETs 810 and 820 each may include a set of REGs, which may be continuous or discontinuous in time and/or frequency domain. In some embodiments, CORESETs 810 and 820 are separated from each other in frequency domain. In one embodiment, as shown in FIG. 8A, frequency-first and localized mapping is applied to REGs in CORESET 810, while frequency-first and distributed mapping is applied to REGs in CORESET 820, so as to separate a first set of REGs 811 allocated for the network device 110-1 from a second set of REGs 821 allocated for the network device 110-2 in frequency domain. For example, with the frequency-first and localized mapping, the first set of REGs 811 allocated for the network device 110-1 are located in one symbol (for example, OFDM symbol #n as shown in FIG. 8A) and concentrated in frequency domain, while the second set of REGs 821 allocated for the network device 110-2 are also located in the same symbol (that is, OFDM symbol #n as shown in FIG. 8A) and distributed in frequency domain. Specially, in some embodiments, the first and second sets of REGs 811 and 821 may have different patterns.

As shown in FIG. 8B, the network device 110-1 uses CORESET 830 for PDCCH transmission, while the network device 110-2 uses CORESET 840 for PDCCH transmission. CORESETs 830 and 840 each may include a set of REGs, which may be continuous or discontinuous in time and/or frequency domain. In some embodiments, CORESETs 830 and 840 are separated from each other in frequency domain. In one embodiment, as shown in FIG. 8B, time-first and localized mapping is applied to REGs in CORESET 830, while time-first and distributed mapping is applied to REGs in CORESET 840, so as to separate a first set of REGs 831 allocated for the network device 110-1 from a second set of REGs 841 allocated for the network device 110-2 in frequency and time domain. For example, with the time-first and localized mapping, the first set of REGs 831 allocated for the network device 110-1 are located in different symbols (for example, OFDM symbols #n and #n+1 as shown in FIG. 8B) and concentrated in frequency domain, while the second set of REGs 841 allocated for the network device 110-2 are also located in the different symbols (that is, OFDM symbols #n and #n+1 as shown in FIG. 8B) and distributed in frequency domain. Specially, in some embodiments, in some embodiments, the first and second sets of REGs 831 and 841 may have different patterns.

Figure 9A:
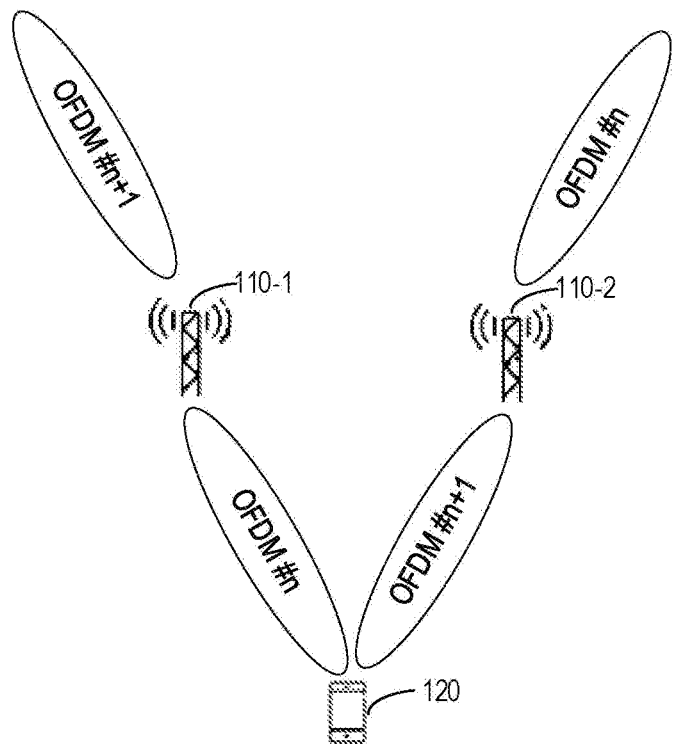
FIGS. 9A-9B show examples of some embodiments of the present disclosure.
Figure 9B:
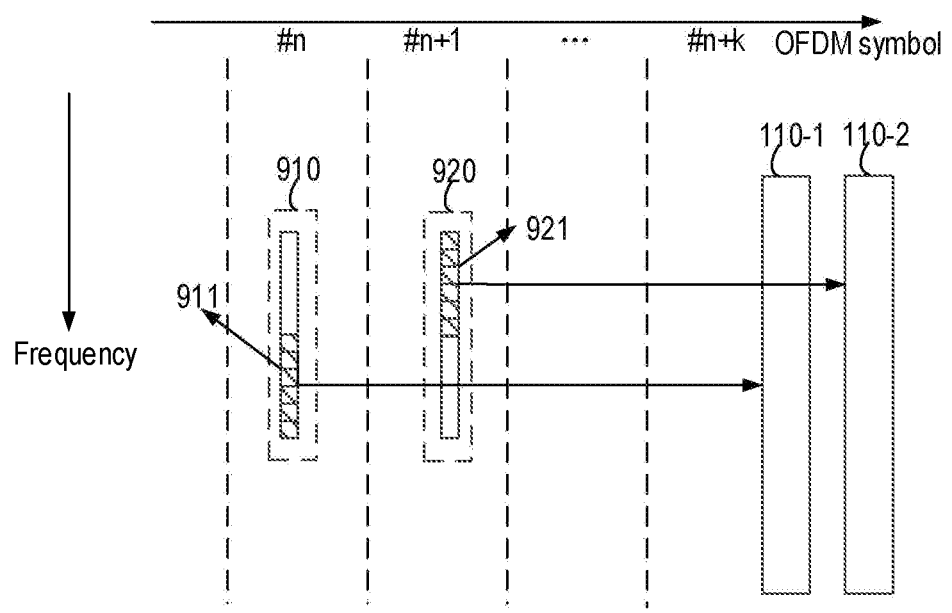

In some embodiment, for example in case that the network devices 110 don't support hybrid beamforming, the first CORESET may also be different from the second CORESET. For example, in some embodiment, the first CORESET for the network device 110-1 and the second CORESET for the network device 110-2 may be multiplexed based on Time Division Multiplexing (TDM) technology. That is, the first and second CORESET are separated from each other in time domain. In this case, the interferences on DMRS can be reduced. FIGS. 9A-9B show examples of such embodiments.

As shown in FIG. 9A, the first CORESET in OFDM symbol #n is used by the network device 110-1 for transmitting control information, while the second CORESET in OFDM symbol #n+1 is used by the network device 110-2 for transmitting control information. As shown in FIG. 9B, the network device 110-1 uses CORESET 910 for PDCCH transmission, while the network device 110-2 uses CORESET 920 for PDCCH transmission. CORESETs 910 and 920 are separated from each other in time domain. In one embodiment, as shown in FIG. 9B, a first set of REGs 911 in CORESET 910 are allocated for the network device 110-1 for PDCCH transmission, while a second set of REGs 921 in CORESET 920 are allocated for the network device 110-2 for PDCCH transmission.

Figure 10A:
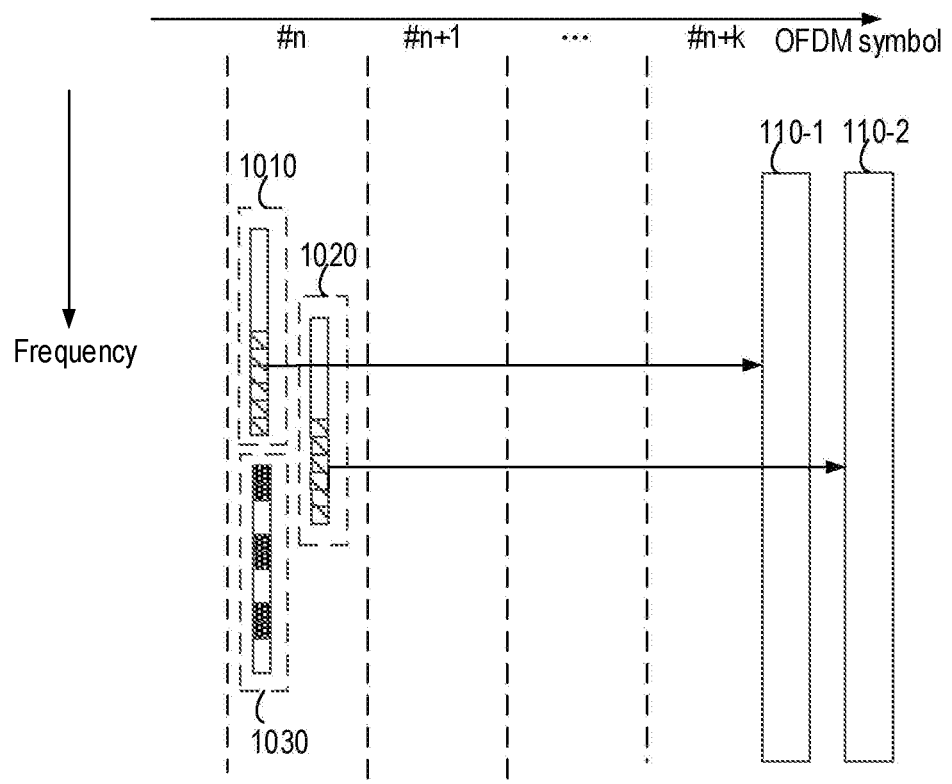
FIGS. 10A-10B show examples of some embodiments of the present disclosure.
Figure 10B:
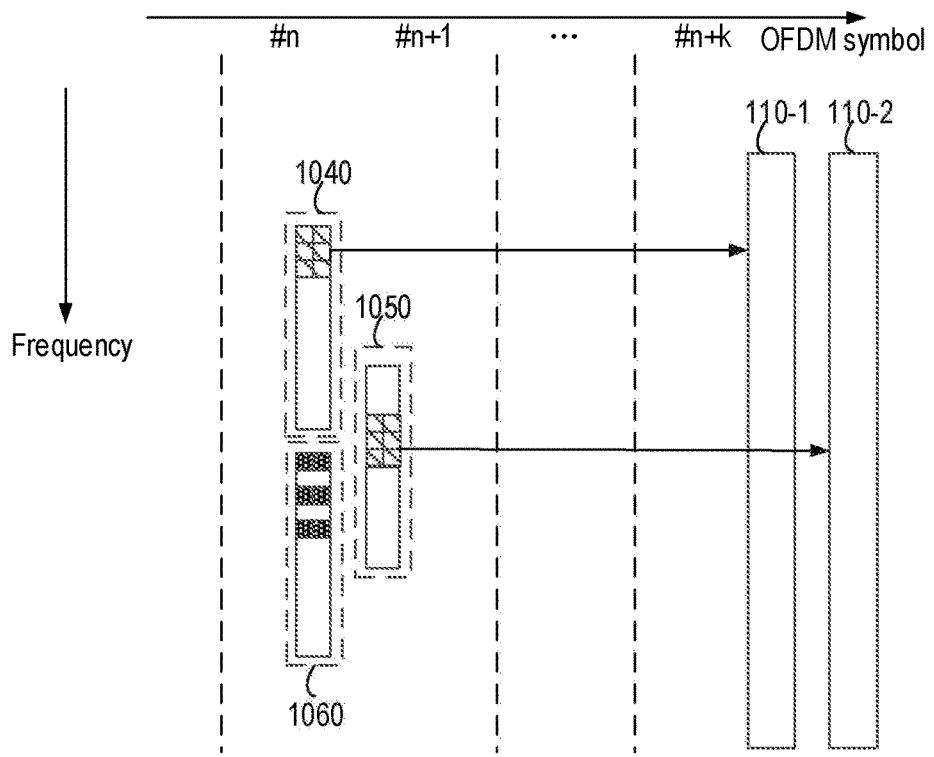

In some embodiment, the first CORESET for the network device 110-1 may be different from the second CORESET for the network device 110-2. In some embodiments, the first and second CORESETs may be at least partially overlapped with each other in time and/or frequency domain. In some embodiments, in case that the first and second CORESETs are at least partially overlapped with each other in time and/or frequency domain, a first RS configuration may be determined for the first RS from the network devices 110-1. For example, the first RS configuration may share a same RS pattern and a same RS sequence with a second RS configuration for the second RS from the network devices 110-2. In some embodiments, the information on the first and second RS configurations may be indicated by the network devices 110-1 and 110-2 to the terminal device 120 in advance, respectively. FIGS. 10A-10B show examples of such embodiments.

In some embodiments, as shown in FIG. 10A, CORESET 1010 is used by the network device 110-1 for PDCCH transmission to a terminal device, and CORESET 1020 is used by the network device 110-2 for PDCCH transmission to the same terminal device. CORESET 1030 is used by a network device for PDCCH transmission to another terminal device. Frequency-first and localized mapping is applied to REGs in CORESETs 1010 and 1020, while frequency-first and distributed mapping is applied to REGs in CORESET 1030. As shown in FIG. 10A, a part of CORESET 1020 may be overlapped with CORESET 1010, while the rest part of CORESET 1020 may be overlapped with CORESET 1030. In this case, the part of CORESET 1020 overlapped with CORESET 1010 may share a same RS pattern and a same RS sequence with CORESET 1010; likewise the rest part of CORESET 1020 overlapped with CORESET 1030 may share a same RS pattern and a same RS sequence with CORESET 1030.

In some embodiments, as shown in FIG. 10B, CORESET 1040 is used by the network device 110-1 for PDCCH transmission to a terminal device, and CORESET 1050 is used by the network device 110-2 for PDCCH transmission to the same terminal device. CORESET 1060 are used by a network device for PDCCH transmission to another terminal device. Time-first and localized mapping is applied to REGs in CORESETs 1040 and 1050, while time-first and distributed mapping is applied to REGs in CORESET 1060. As shown in FIG. 10B, a part of CORESET 1050 may be overlapped with CORESET 1040, while the rest part of CORESET 1050 may be overlapped with CORESET 1060. In this case, the part of CORESET 1050 overlapped with CORESET 1040 may share a same RS pattern and a same RS sequence with CORESET 1040; likewise the rest part of CORESET 1050 overlapped with CORESET 1060 may share a same RS pattern and a same RS sequence with CORESET 1060.

In some other embodiments, an alternative solution can be provided for the situations as shown in FIGS. 10A-10B. For example, FIGS. 11A-11B show examples of the alternative solution for the situations as shown in FIGS. 10A-10B.

Figure 11A:
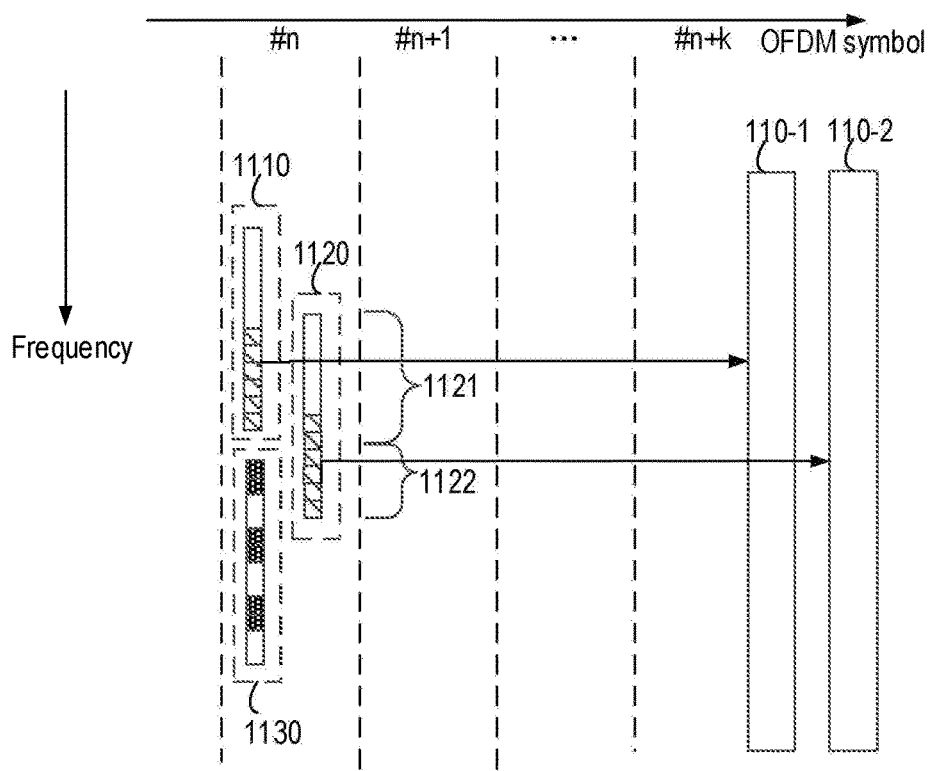
FIGS. 11A-11B show examples of some embodiments of the present disclosure.

In some embodiments, as shown in FIG. 11A, CORESET 1110 is used by the network device 110-1 for PDCCH transmission to a terminal device, and CORESET 1120 is used by the network device 110-2 for PDCCH transmission to the same terminal device. CORESET 1130 is used by a network device for PDCCH transmission to another terminal device. Frequency-first and localized mapping is applied to REGs in CORESETs 1110 and 1120, while frequency-first and distributed mapping is applied to REGs in CORESET 1130. As shown in FIG. 11A, a part of CORESET 1120 may be overlapped with CORESET 1110, while the rest part of CORESET 1120 may be overlapped with CORESET 1130. In this case, CORESET 1120 can be divided into two subsets, which are sub-CORESETs 1121 and 1122. A first sub-RS configuration for sub-CORESET 1121 may be different from that for a second sub-RS configuration for sub-CORESET 1122, for example, in different RS patterns and/or different RS sequences. For example, the first and second sub-RS configurations may be indicated to the terminal device 120 in advance. The terminal device 120 may decode sub-CORESET 1121 based on the first sub-RS configuration and decode sub-CORESET 1122 based on the second sub-RS configuration. Then, the terminal device 120 may merge sub-CORESETs 1121 and 1122 into the original CORESET 1120.

Figure 11B:
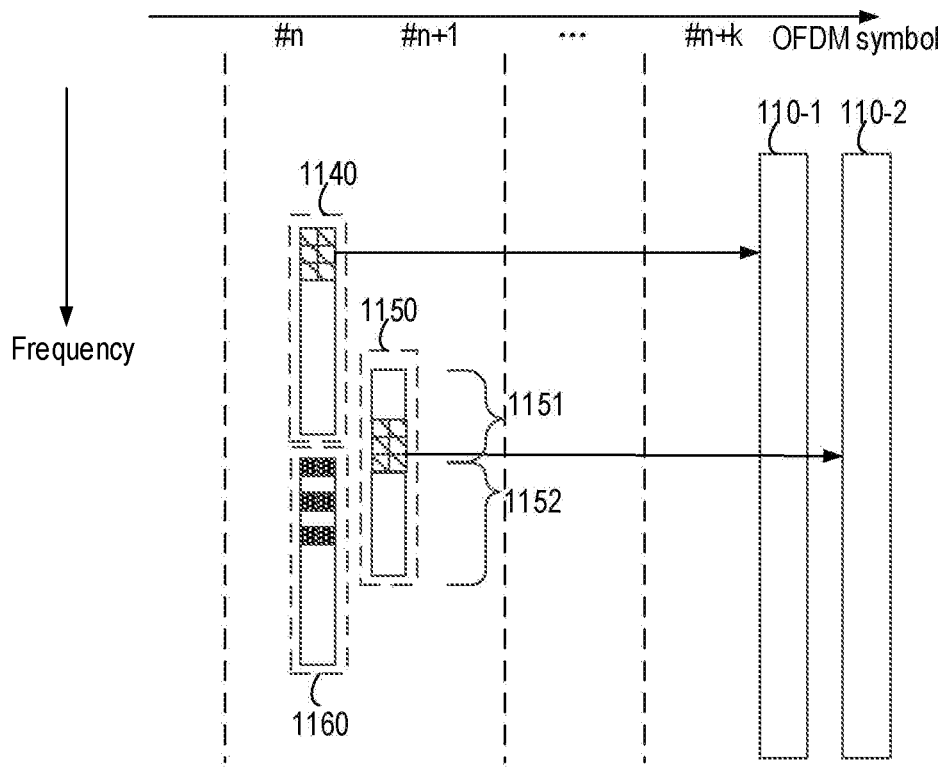

In some embodiments, as shown in FIG. 11B, CORESET 1140 is used by the network device 110-1 for PDCCH transmission to a terminal device, and CORESET 1150 is used by the network device 110-2 for PDCCH transmission to the same terminal device. CORESET 1160 is used by a network device for PDCCH transmission to another terminal device. Time-first and localized mapping is applied to REGs in CORESETs 1140 and 1150, while time-first and distributed mapping is applied to REGs in CORESET 1160. As shown in FIG. 11B, a part of CORESET 1150 may be overlapped with CORESET 1140, while the rest part of CORESET 1150 may be overlapped with CORESET 1160. In this case, CORESET 1150 can be divided into two subsets, which are sub-CORESETs 1151 and 1152. A third sub-RS configuration for sub-CORESET 1151 may be different from that for a fourth sub-RS configuration for sub-CORESET 1152, for example, in different RS patterns and/or different RS sequences. For example, the third and fourth sub-RS configurations may be indicated to the terminal device 120 in advance. The terminal device 120 may decode sub-CORESET 1151 based on the third sub-RS configuration and decode sub-CORESET 1152 based on the third sub-RS configuration. Then, the terminal device 120 may merge sub-CORESETs 1151 and 1152 into the original CORESET 1150.

Figure 12:
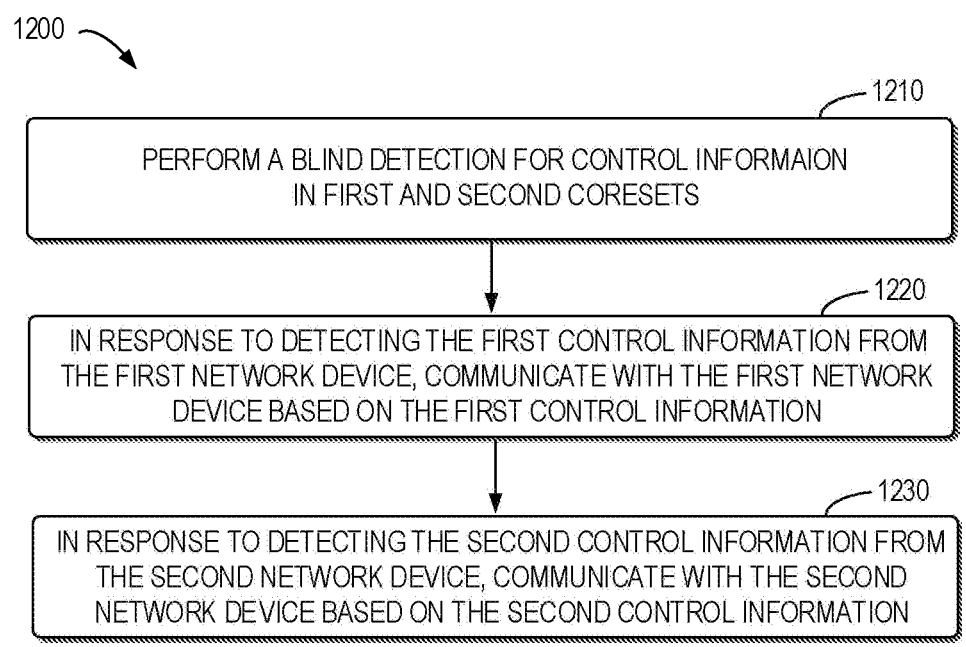
FIG. 12 shows a flowchart of an example method in accordance with some embodiments of the present disclosure.

FIG. 12 shows a flowchart of an example method 1200 in accordance with some embodiments of the present disclosure. The method 1200 can be implemented at the terminal device 120 as shown in FIG. 1. For the purpose of discussion, the method 1200 will be described from the perspective of the terminal device 120 with reference to FIG. 1.

In act 1210, the terminal device 120 performs a blind detection for control information in first and second CORESETs, first control information being transmitted from a first network device to the terminal device based on a first configuration, second control information being transmitted from a second network device to the terminal device based on a second configuration, the first and second configurations being determined based on the first and second CORESETs respectively, and the first configuration being different from the second configuration.

In act 1220, in response to detecting the first control information from the first network device, the terminal device 120 communicates with the first network device based on the first control information.

In act 1230, in response to detecting the second control information from the second network device, the terminal device 120 communicates with the second network device based on the second control information In some embodiments, the first configuration may indicate a first set of REs in the first CORESET are allocated for transmitting the first control information via a first control channel and a second set of REs in the first CORESET are allocated for transmitting a first RS associated with the first control channel. In some embodiments, the second configuration may indicate a third set of REs in the second CORESET are allocated for transmitting the second control information via a second control channel and a fourth set of REs in the second CORESET are allocated for transmitting a second RS associated with the second control channel.

In some embodiments, the first CORESET may be same as the second CORESET.

In some embodiments, the method 1200 may further comprises: receiving first and second RS configurations from the first and second network devices respectively, the first and second RS configurations indicating different RS patterns and/or different RS sequences for the first and second RSs; and detecting the first RS from the first network device based on the first RS configuration, while detecting the second RS from the second network device based on the second RS configuration.

In some embodiments, performing the blind detection for control information may comprise: detecting the first control information at least based on the first RS; and detecting the second control information at least based on the second RS.

In some embodiments, the first CORESET may be different from the second CORESET, and the first and second CORESETs may be separated from each other in both time and frequency domain.

In some embodiments, the first CORESET may be different from the second CORESET, and the first and second CORESETs may be at least partially overlapped with each other in time or frequency domain.

Figure 13:
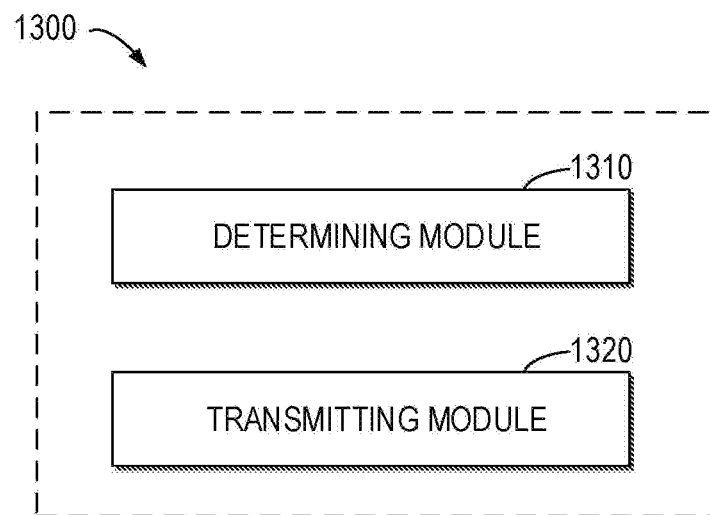
FIG. 13 shows a block diagram of an apparatus in accordance with some embodiments of the present disclosure.

FIG. 13 shows a block diagram of an apparatus 1300 in accordance with some embodiments of the present disclosure. The apparatus 1300 can be considered as an example implementation of the network device 110-1 and/or 110-2 as shown in FIG. 1. As shown, the apparatus 1300 includes a determining module 1310 configured to determine, based on a first control resource set (CORESET), a first configuration for transmitting first control information from the first network device to a terminal device, the first configuration being different from a second configuration for transmitting second control information from a second network device to the terminal device and the second configuration being determined based on a second CORESET. The apparatus 1300 also includes a transmitting module 1320 configured to transmit, based on the first configuration, the first control information to the terminal device.

Figure 14:
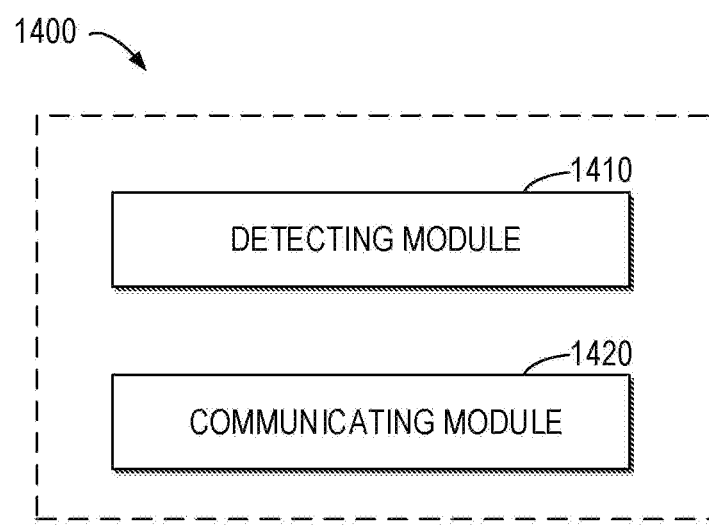
FIG. 14 shows a block diagram of an apparatus in accordance with some embodiments of the present disclosure.

FIG. 14 shows a block diagram of an apparatus 1400 in accordance with some embodiments of the present disclosure. The apparatus 1400 can be considered as an example implementation of the terminal device 120 as shown in FIG. 1. As shown, the apparatus 1400 includes a detecting module 1410 configured to perform a blind detection for control information in first and second control resource sets (CORESETs), first control information being transmitted from a first network device to the terminal device based on a first configuration, second control information being transmitted from a second network device to the terminal device based on a second configuration, the first and second configurations being determined based on the first and second CORESETs respectively, and the first configuration being different from the second configuration. The apparatus 1400 also includes a communicating module 1020 configured to, in response to detecting the first control information from the first network device, communicate with the first network device based on the first control information; and in response to detecting the second control information from the second network device, communicate with the second network device based on the second control information.

For the sake of clarity, FIGS. 13 and/or 14 do not illustrate some optional modules of the apparatuses 1300 and/or 1400. However, it should be understood that various features as described with reference to FIGS. 1-12 are likewise applicable to the apparatuses 1300 and/or 1400. Moreover, respective modules of the apparatuses 1300 and/or 1400 may be hardware modules or software modules. For example, in some embodiments, the apparatuses 1300 and/or 1400 may be implemented partially or completely by software and/or firmware, e.g., implemented as a computer program product embodied on the computer-readable medium. Alternatively, or in addition, the apparatuses 1300 and/or 1400 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 15:
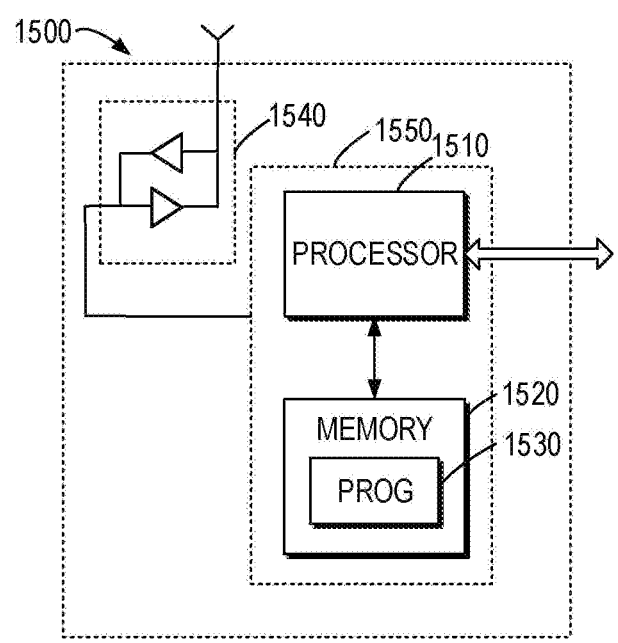
FIG. 15 is a simplified block diagram of a device that is suitable for implementing embodiments of the present disclosure.

FIG. 15 is a simplified block diagram of a device 1500 that is suitable for implementing embodiments of the present disclosure. The device 1500 can be considered as a further example implementation of a network device 110 or a terminal device 120 as shown in FIG. 1. Accordingly, the device 1500 can be implemented at or as at least a part of the network devices 110 or the terminal device 120.

As shown, the device 1500 includes a processor 1510, a memory 1520 coupled to the processor 1510, a suitable transmitter (TX) and receiver (RX) 1540 coupled to the processor 1510, and a communication interface coupled to the TX/RX 1540. The memory 1510 stores at least a part of a program 1530. The TX/RX 1540 is for bidirectional communications. The TX/RX 1540 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1530 is assumed to include program instructions that, when executed by the associated processor 1510, enable the device 1500 to operate in accordance with the embodiments of the present disclosure, as discussed herein with reference to FIGS. 1 to 12. The embodiments herein may be implemented by computer software executable by the processor 1510 of the device 1500, or by hardware, or by a combination of software and hardware. The processor 1510 may be configured to implement various embodiments of the present disclosure. Furthermore, a combination of the processor 1510 and memory 1510 may form processing means 1550 adapted to implement various embodiments of the present disclosure.

The memory 1510 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1510 is shown in the device 1500, there may be several physically distinct memory modules in the device 1500. The processor 1510 may be of any type suitable to the local technical network, and may include one or more of general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A network device comprising:
   a processor; and
   a memory coupled to the processor and storing instructions thereon, the instructions, when executed by the processor, causing the network device to perform actions, the actions comprising:
   determining, based on a first control resource set (CORESET), a first configuration for transmitting first control information from the network device to a terminal device, the first configuration being different from a second configuration for transmitting second control information from a further network device to the terminal device and the second configuration being determined based on a second CORESET; and
   transmitting, based on the first configuration, the first control information to the terminal device,
   wherein
   the first configuration indicates that a first set of resource elements (REs) in the first CORESET are allocated for transmitting the first control information via a first control channel and a second set of REs in the first CORESET are allocated for transmitting a first reference signal (RS) associated with the first control channel, and
   the second configuration indicates that a third set of REs in the second CORESET are allocated for transmitting the second control information via a second control channel and a fourth set of REs in the second CORESET are allocated for transmitting a second RS associated with the second control channel.

2. The network device of claim 1, wherein determining the first configuration comprises:
   determining the first configuration, such that the first RS differs from the second RS based on at least one of the following: different resource allocation in time, frequency and/or code domain; different Orthogonal Covering Codes; different RS sequences and different cyclic shifts.

3. The network device of claim 2, wherein the actions further comprises:
   determining a first RS configuration for the first RS, the first RS configuration being different from a second RS configuration for the second RS, and the first and second RS configurations being based on different RS patterns and/or different RS sequences;
   indicating the first RS configuration to the terminal device; and transmitting, based on the second set of REs and the first RS configuration, the first RS to the terminal device.

4. The network device of claim 3, wherein the first CORESET is same as the second CORESET.

5. The network device of claim 4, wherein determining the first configuration comprises:
determining the first configuration, such that the first set of REs are at least partially separated from the third set of REs in time or frequency domain.

6. The network device of claim 1, wherein the first CORESET is different from the second CORESET, and the first and second CORESETs are separated from each other in time and/or frequency domain.

7. The network device of claim 1, wherein the first CORESET is different from the second CORESET, and the first and second CORESETs are at least partially overlapped with each other in time and/or frequency domain.

8. The network device of claim 7, wherein the actions further comprises:
determining a first RS configuration for the first RS, the first RS configuration sharing a same RS pattern and a same RS sequence with a second RS configuration for the second RS; and
indicating the first RS configuration to the terminal device; and
transmitting, based on the second set of REs and the first RS configuration, the first RS to the terminal device.

9. A terminal device, comprising:
a processor; and
a memory coupled to the processor and storing instructions thereon, the instructions, when executed by the processor, causing the terminal device to perform actions, the actions comprising:
performing a blind detection for control information in first and second control resource sets (CORESETs), wherein first control information is transmitted from a first network device to the terminal device based on a first configuration, second control information is transmitted from a second network device to the terminal device based on a second configuration, the first and second configurations are determined based on the first and second CORESETs respectively, and the first configuration is different from the second configuration;
in response to detecting the first control information from the first network device, communicating with the first network device based on the first control information; and
in response to detecting the second control information from the second network device, communicating with the second network device based on the second control information,
wherein
the first configuration indicates that a first set of resource elements (REs) in the first CORESET are allocated for transmitting the first control information via a first control channel and a second set of REs in the first CORESET are allocated for transmitting a first reference signal (RS) associated with the first control channel, and
the second configuration indicates that a third set of REs in the second CORESET are allocated for transmitting the second control information via a second control channel and a fourth set of REs in the second CORESET are allocated for transmitting a second RS associated with the second control channel.

10. The terminal device of claim 9, wherein the first CORESET is same as the second CORESET.

11. The terminal device of claim 10, wherein the actions further comprises:
receiving first and second RS configurations from the first and second network devices respectively, the first and second RS configurations indicating different RS patterns and/or different RS sequences for the first and second RSs; and
detecting the first RS from the first network device based on the first RS configuration, while detecting the second RS from the second network device based on the second RS configuration.

12. The terminal device of claim 11, wherein performing the blind detection for control information comprises:
detecting the first control information at least based on the first RS; and
detecting the second control information at least based on the second RS.

13. The terminal device of claim 9, wherein the first CORESET is different from the second CORESET, and the first and second CORESETs are separated from each other in both time and frequency domain.

14. The terminal device of claim 9, wherein the first CORESET is different from the second CORESET, and the first and second CORESETs are at least partially overlapped with each other in time or frequency domain.

15. A method comprising:
determining, at a first network device and based on a first control resource set (CORESET), a first configuration for transmitting first control information from the first network device to a terminal device, the first configuration being different from a second configuration for transmitting second control information from a second network device to the terminal device and the second configuration being determined based on a second CORESET; and
transmitting, based on the first configuration, the first control information to the terminal device,
wherein
the first configuration indicates that a first set of resource elements (REs) in the first CORESET are allocated for transmitting the first control information via a first control channel and a second set of REs in the first CORESET are allocated for transmitting a first reference signal (RS) associated with the first control channel, and
the second configuration indicates that a third set of REs in the second CORESET are allocated for transmitting the second control information via a second control channel and a fourth set of REs in the second CORESET are allocated for transmitting a second RS associated with the second control channel.

16. The method of claim 15, wherein determining the first configuration comprises:
determining the first configuration, such that the first RS differs from the second RS based on at least one of the following: different resource allocation in time, frequency and/or code domain; different Orthogonal Cover Codes; different RS sequences and different cyclic shifts.

17. The method of claim 16, wherein the method further comprises:
determining a first RS configuration for the first RS, the first RS configuration being different from a second RS configuration for the second RS, and the first and second RS configurations being based on different RS patterns and/or different RS sequences;
indicating the first RS configuration to the terminal device; and
transmitting, based on the second set of REs and the first RS configuration, the first RS to the terminal device.

* * * * *